Jan. 25, 1949.　　　　　P. H. JONES　　　　　2,460,258

TANK PUMP-OUT METHOD

Filed Nov. 20, 1944

PHILIP H. JONES,
INVENTOR.

BY Ross J. Garofalo
ATTORNEY.

Patented Jan. 25, 1949

2,460,258

UNITED STATES PATENT OFFICE 2,460,258

TANK PUMP-OUT METHOD

Philip H. Jones, Redondo Beach, Calif., assignor to Union Oil Company of California, Los Angeles, Calif., a corporation of California Application November 20, 1944, Serial No. 564,372

7 Claims. (Cl. 210—51)

My invention relates to an improvement in tank pump out methods and apparatuses, and it is especially adapted for the accurate determination of the volume of dry oil withdrawn from the tank and the obtaining of a high gauge sample truly representative of the oil removed.

It is the object of my invention to provide a method and an apparatus whereby high gauging and high gauge samples are truly representative of the quality of the oil being pumped from the tank and shipped out. Another object of my invention is to determine the exact volume of oil and water removed from the tank during the pumping operation.

In carrying out my invention, I have provided a tank equipped with a water out line and an oil pump out line which are provided with horizontal openings in the tank at exactly the same elevation. Prior to the introduction of oil into the tank the space between the floor of the tank and the horizontal openings, above mentioned, is filled with water, and then followed by the introduction of oil thereinto. Before gauging and sampling any water that separates from the oil is drawn out through the water out line, thus leaving a water level in the tank even with the elevations of the two horizontal openings. The water out line valve is then closed, the tank gauged and the contents of the tank above the water level sampled. The contents of the tank are then pumped or gravitated out through oil pump out line until suction is lost, at this point a low gauge is taken to determine the volume of oil removed. By this procedure, any water that may settle out of the oil subsequent to the high gauge sampling is pumped out with the oil thus avoiding the displacement of water in the oil being pumped out by oil from the section below the horizontal openings, because this space is at all times filled with water. Thus, the high gauge sample is truly representative of the oil pumped out and shipped thereby allowing an accurate determination of the volume of dry oil withdrawn from the tank to be made.

Figure 1:
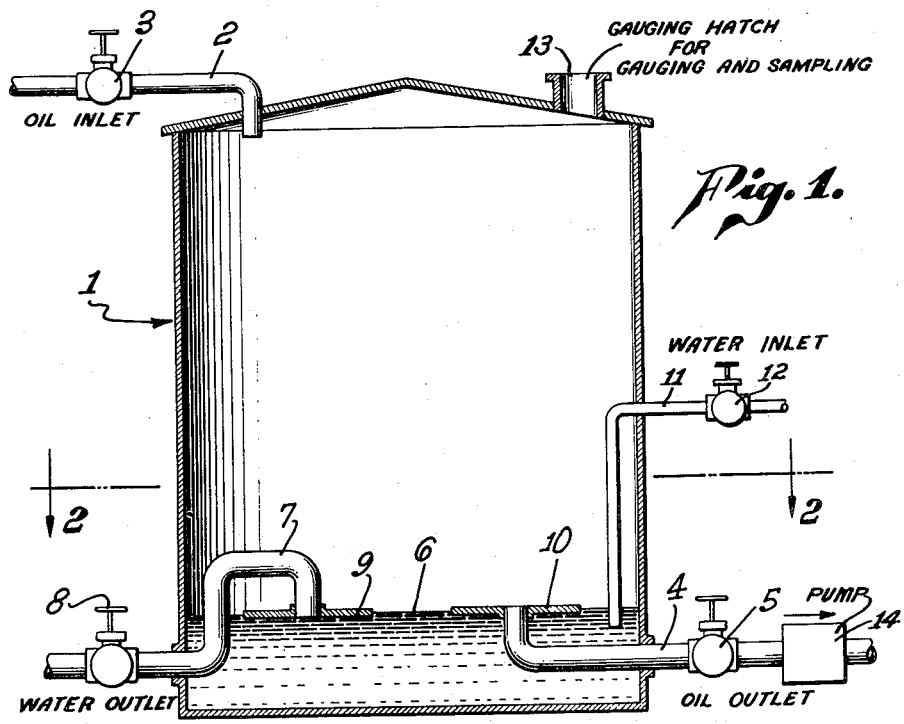
Figure 2:
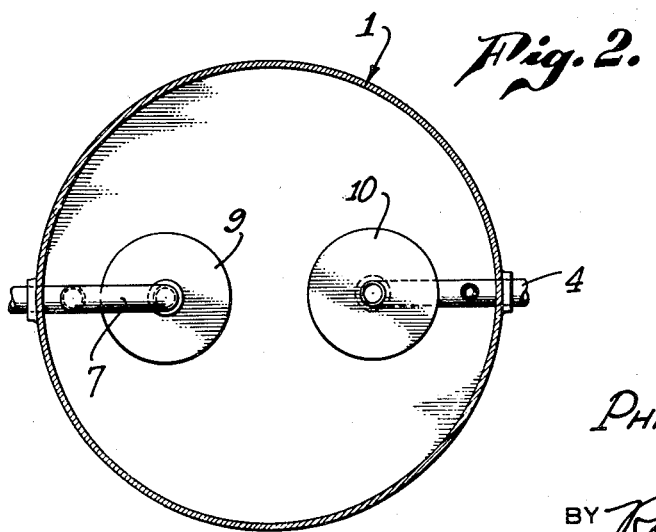

For a better understanding of my invention reference may be had to the accompanying drawings. Figure 1 represents the invention in toto while Figure 2 is a top view representing one modification of the baffles used in the invention. Referring to Figure 1 storage tank 1 is provided with inlet line 2 controlled by valve 3 located in the upper portion thereof for the introduction of oil into tank 1 and an outlet line 4 controlled by valve 5 located in the lower portion and sufficiently above the bottom thereof to be above the level of any sediment settling therein and above the level of the water pool 6 in the bottom of the tank. Storage tank 1 is also equipped with water out line 7 controlled by valve 8. Water out line 7 and oil out line 4 are provided with horizontal openings in the tank at exactly the same elevation and if desired with stilling baffles 9 and 10 respectively, such as that shown in Figure 2 so as to prevent coning of the liquid being removed.

In operation the space below baffles 9 and 10 is filled with water by any suitable means such as by line 11 controlled by valve 12 leading into tank 1. After the water level reaches baffles 9 and 10 the water is shut off and oil introduced into tank 1 by means of line 2 controlled by valve 3. When tank 1 is filled with oil the contents are allowed to settle for a designated period depending upon the amount of water in the oil, the rate the water settles out and the time necessary to allow the shipping oil to reach the degree of dryness desired. After allowing the oil to settle for the designated period, the water separating out is drawn off by means of line 7 controlled by valve 8. This is accomplished by running water out through line 7 until traces of oil are obtained. When the above mentioned traces of oil are obtained line 7 is closed by means of valve 8 and the tank is gauged by any conventional method, such as by means of a measuring tape which may be inserted into the tank through gauging hatch 13. The contents of the tank above baffles 9 and 10 are then sampled such as by inserting any conventional sampling device through gauging hatch 13 to whatever level in the tank from which it is desired to take the sample and tests are run on the sample to determine its gravity, water content, etc. The contents of the tank are then pumped by means of pump 14 or gravitated out through oil pump out line 4 controlled by valve 5 until suction is lost at which time a low gauge is taken. By this procedure, any water that settles out of the oil subsequent to sampling is pumped out with the oil and no water can be displaced in the oil being shipped by oil from the space below the suction level, because this space is at all times filled with water. Thus, the high gauge sample is truly representative of the oil being shipped, and an accurate determination of the volume of dry oil withdrawn from the tank can be made. Although gauging and sampling operations are essential in carrying out the process of my invention these operations are well known in the art and the methods used to perform them do not constitute a part of the invention.

The foregoing description of my invention is not to be taken as limiting my invention but only as illustrative thereof since many variations may be made by those skilled in the art without departing from the scope of the following claims.

I claim:

1. The method of pumping oil from an oil storage tank having a water out line and an oil pump out line with horizontal openings in the tank at the same elevation above the bottom of the tank, comprising introducing water into the tank in sufficient quantities so as to create a water level even with the elevation of the two horizontal openings, filling the tank with oil, allowing at least some of the water contained in said oil to settle, draining water level down to the elevation of the two horizontal openings, closing water drain, and pumping dry oil out of the tank.

2. The method of pumping oil from an oil storage tank having a water out line and an oil pump out line with horizontal openings having baffles encircling said openings in the tank at the same elevation above the bottom of the tank, comprising introducing water into the tank in sufficient quantities so as to create a water level even with the elevation of the two horizontal openings, filling the tank with oil, allowing at least some of the water contained in said oil to settle, draining water level down to the elevation of the two horizontal openings, closing water drain, and pumping dry oil out of the tank.

3. The method of pumping wet oil from an oil storage tank having a water out line and an oil pump out line with horizontal openings in the tank at the same elevation above the bottom of the tank, comprising introducing water into the tank in sufficient quantities so as to create a water level even with the elevation of the two horizontal openings, filling the tank with wet oil, allowing at least some of the water to settle from the oil, draining water level down to the elevation of the two horizontal openings through said water out line closing said water out line, sampling the oil above the water level to determine the average water contact of said oil, and pumping oil together with any water settling from the oil subsequent to sampling.

4. The method of pumping wet oil from an oil storage tank having a water out line and an oil pump out line with horizontal openings in the tank at exactly the same elevation above the bottom of the tank, comprising introducing water into the tank in sufficient quantities so as to create a water level even with the elevation of the two horizontal openings, filling the tank with wet oil, allowing at least some of the water to settle from the oil, draining water level down to the elevation of the two horizontal openings, through a water drain closing said water drain, gauging and sampling the oil above the water level to determine the average water content of said oil, pumping oil together with any water settling from the oil subsequent to sampling, and gauging the residual oil therein.

5. An apparatus for pumping oil from an oil storage tank comprising an oil storage tank provided with means for introducing water thereinto, an oil out means and a water out means provided with horizontal openings in the lower part of the tank at the same elevation above the bottom of the tank, means for introducing oil into the tank and means for pumping dry oil out of the tank.

6. An apparatus for pumping oil from an oil storage tank comprising an oil storage tank provided with means for introducing water thereinto, an oil out means and a water out means provided with horizontal openings with means for preventing the coning of liquids being removed therethrough in the lower part of the tank at the same elevation above the bottom of the tank, means for introducing oil into the tank and means for pumping dry oil out of the tank.

7. An apparatus for pumping oil from an oil storage tank comprising an oil storage tank provided with means for introducing water thereinto, an oil out means and a water out means provided with horizontal openings having baffles circumscribing said openings to prevent coning of liquids being removed therethrough in the lower part of the tank at the same elevation above the bottom of the tank, means for introducing oil into the tank and means for pumping dry oil out of the tank.

PHILIP H. JONES.

REFERENCES CITED

The following references are of record in the file of this patent:

UNITED STATES PATENTS

| Number | Name | Date |
|---|---|---|
| 83,430 | Winnans | Oct. 27, 1868 |
| 506,670 | Cobb | Oct. 17, 1893 |
| 904,539 | Koenig | Nov. 24, 1908 |
| 1,095,827 | Diall | May 5, 1914 |
| 1,345,090 | Keller | June 29, 1920 |
| 1,694,471 | Jacobi | Dec. 11, 1928 |
| 1,723,197 | Montgomery | Aug. 6, 1929 |
| 1,776,498 | Freeland | Sept. 23, 1930 |
| 1,960,686 | Tumin | May 29, 1934 |
| 2,199,874 | Brand | May 7, 1940 |
| 2,364,022 | Gillard | Nov. 28, 1944 |